United States Patent [19]

Engler

[11] Patent Number: 5,181,581
[45] Date of Patent: Jan. 26, 1993

[54] RACK BUSHING WITH INTEGRAL SEAL

[75] Inventor: Leonard W. Engler, Rochester Hills, Mich.

[73] Assignee: TRW Inc., Lyndhurst, Ohio

[21] Appl. No.: 652,584

[22] Filed: Feb. 8, 1991

[51] Int. Cl.[5] .............................................. B62D 5/22
[52] U.S. Cl. ................................. 180/148; 180/132; 92/168; 277/153; 384/16
[58] Field of Search ........ 180/132, 145, 148, 150–154, 180/158–160, 162; 384/903, 16, 29, 32, 42, 908, 909; 92/168; 277/153, 212 F, 181, 58

[56] References Cited

U.S. PATENT DOCUMENTS

| 2,387,182 | 10/1945 | Procter | 277/153 |
| 3,366,425 | 1/1968 | Genz | 384/16 |
| 3,831,697 | 8/1974 | Wahlmark | 180/79.2 |
| 4,195,854 | 4/1980 | Bertin | 277/153 |
| 4,211,152 | 7/1980 | Colletti et al. | 92/168 |
| 4,351,228 | 9/1982 | Schultz et al. | 92/128 |
| 4,721,175 | 1/1988 | Butler | 180/148 |

FOREIGN PATENT DOCUMENTS 0544881 4/1942 United Kingdom ............... 277/153

Primary Examiner—Margaret A. Focarino
Assistant Examiner—Anne Marie Boehler
Attorney, Agent, or Firm—Tarolli, Sundheim & Covell

[57] ABSTRACT

A bushing and a seal member are disposed within a tubular housing partially defining the fluid chamber of a fluid power rack and pinion vehicle steering gear. The steering gear rack is axially movable within the chamber and extends axially through the seal and the bushing. The bushing supports the rack for axial movement in the tubular housing. The inner seal surface of the seal member sealingly engages the rack. The outer seal surface of the seal member sealingly engages the cylinder wall. The seal member and the retaining ridge have interdigitated portions which are urged into interlocking engagement by the cylinder wall.

1 Claim, 3 Drawing Sheets

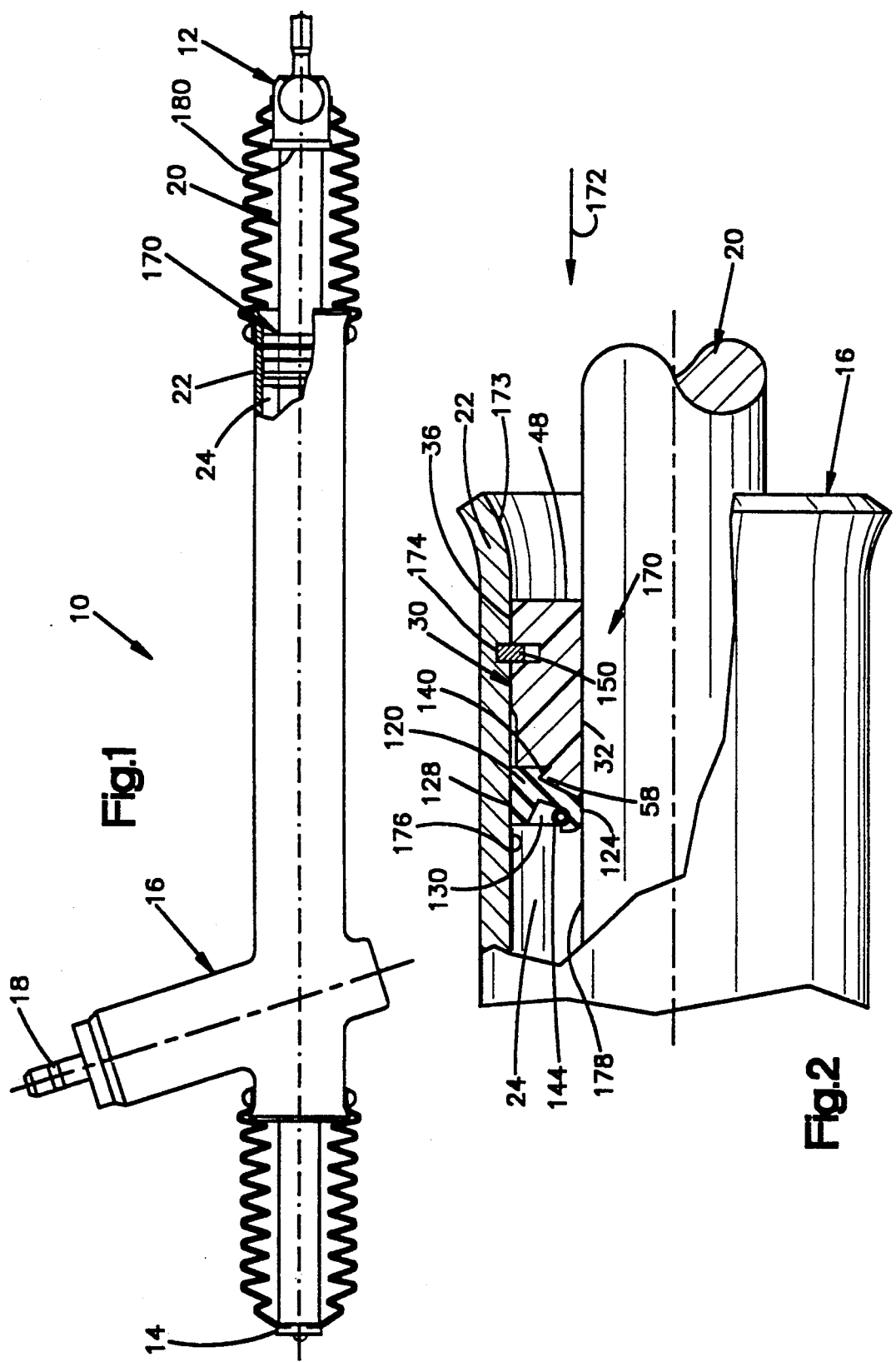

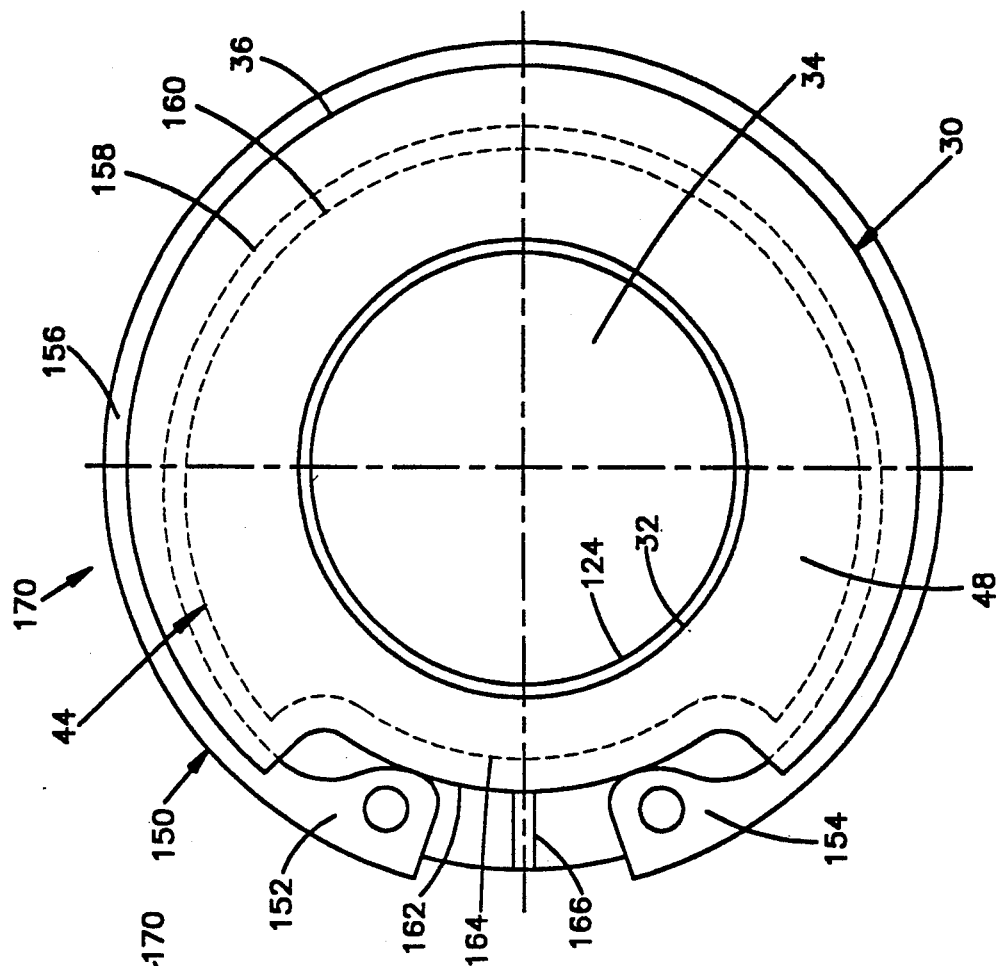
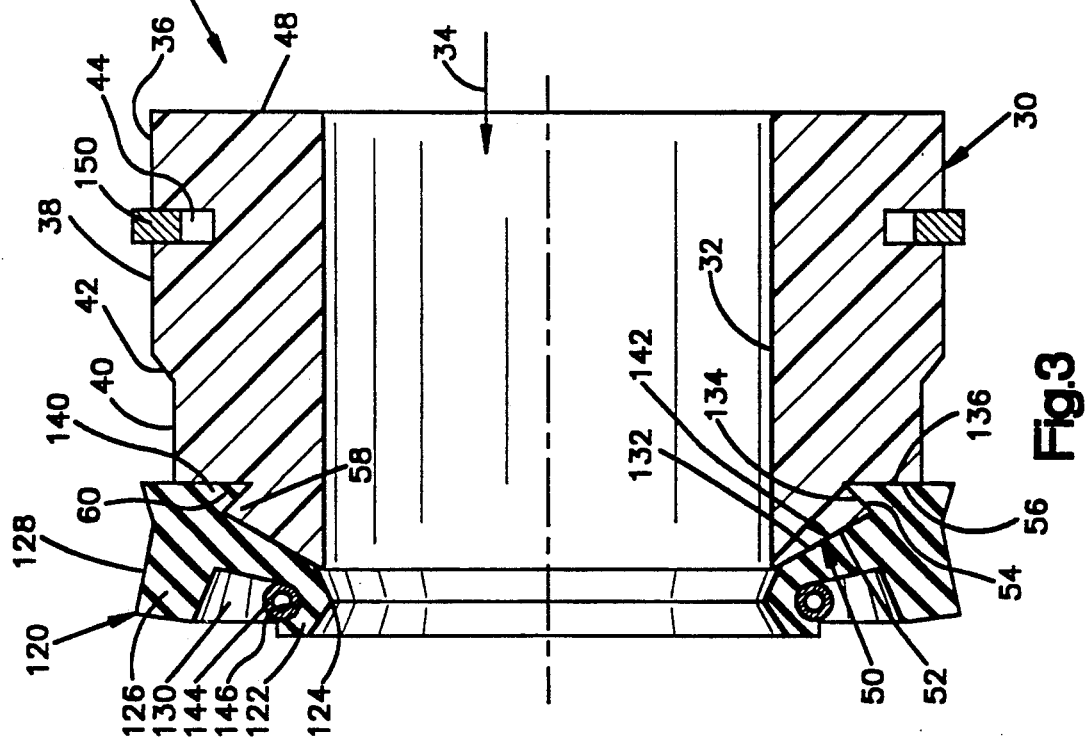

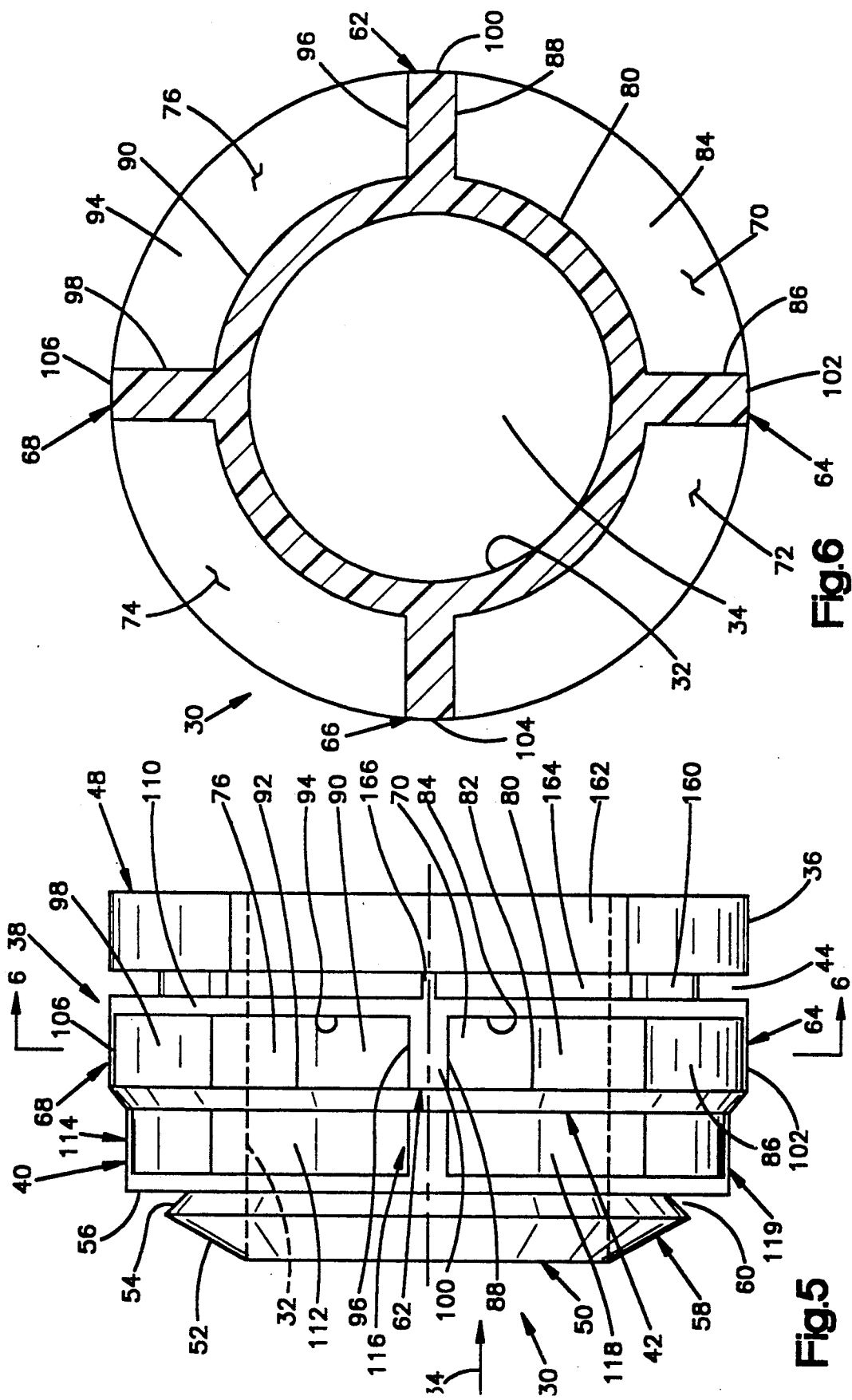

RACK BUSHING WITH INTEGRAL SEAL

BACKGROUND OF THE INVENTION

1. Technical Field

The present invention relates to apparatus for sealing a fluid chamber, and particularly to apparatus for sealing a fluid chamber of a fluid power rack and pinion vehicle steering gear.

2. Description of the Prior Art

A fluid power rack and pinion vehicle steering gear commonly includes a rack which extends axially through a chamber. The ends of the rack project axially outwardly from the ends of the chamber. Steering linkage is connected to the projecting ends of the rack and to steerable wheels of the vehicle.

A piston is fixed to the rack within the chamber. Rotation of the vehicle steering wheel actuates a hydraulic valve and causes fluid under pressure to be directed against the piston. The force exerted by the fluid moves the piston within the chamber and moves the rack axially. Axial movement of the rack moves the steering linkage to turn the steerable wheels of the vehicle.

To prevent fluid from flowing out of the chamber, it is necessary to seal the ends of the chamber through which the rack projects. It is also desirable to support the rack at least at one end of the chamber for axial movement. Accordingly, various combinations of seals and bushings have been employed for performing these functions.

SUMMARY OF THE INVENTION

The present invention is an apparatus including annular bushing and a seal member connected with the bushing. The annular bushing has a cylindrical outer surface and a cylindrical inner surface which is spaced radially inward from the outer surface and which defines a passage extending longitudinally through the bushing. The bushing has an annular radially extending end face between the inner and outer surfaces of the bushing. The annular seal member has an outer seal surface and an inner seal surface spaced radially inward from the outer seal surface and defining a passage extending longitudinally through the seal member coaxial with the passage in the bushing. The seal member has an annular radially extending end face between the inner and outer seal surfaces.

The bushing end face has a radially projecting annular retaining ridge. The seal member includes a lip portion extending radially inwardly. The retaining ridge on the bushing and the lip portion on the seal member are interdigitated and connect the seal member and the bushing together.

In a preferred embodiment of the invention, the bushing and the seal member are disposed in a tubular housing which defines a fluid chamber of a fluid power rack and pinion vehicle steering gear. A rack is axially movable within the chamber. The rack extends through passages in the seal and the bushing. The bushing supports the rack for axial movement in the chamber. The inner seal surface of the seal member sealingly engages the rack. The outer seal surface of the seal member sealingly engages the tubular housing. The lip portion of the seal member and the retaining ridge of the bushing are urged into interlocking engagement by the tubular housing.

BRIEF DESCRIPTION OF THE DRAWINGS

The foregoing and other features of the present invention will become apparent to one skilled in the art upon a consideration of the following description of the invention with reference to the accompanying drawings, in which:

FIG. 1 is a schematic view of a power rack and pinion vehicle steering gear with parts cut away and constructed in accordance with the present invention;

FIG. 2 is an enlarged view of a portion of FIG. 1 showing a rack bushing and seal assembly in accordance with the present invention;

FIG. 3 is a transverse sectional view of the assembly of FIG. 2;

FIG. 4 is an end view of the assembly of FIG. 3;

FIG. 5 is an elevational view of the bushing of FIG. 2; and

FIG. 6 is a sectional view taken along line 6—6 of FIG. 5.

DESCRIPTION OF A PREFERRED EMBODIMENT

The present invention relates to a rack and pinion vehicle steering gear, and particularly to apparatus for sealing the fluid chamber of a fluid power rack and pinion vehicle steering gear. The present invention is applicable to various steering gear constructions. As representative of the present invention, FIG. 1 illustrates a fluid power rack and pinion vehicle steering gear 10. The steering gear 10 is connected with a pair of steerable vehicle wheels (not shown) in a known manner by steering linkage 12 at one end of the steering gear 10 and by steering linkage (not shown) at the opposite end 14 of the steering gear 10.

The steering gear 10 includes a housing 16, a pinion 18 and a rack 20. The rack 20 extends longitudinally through a tubular portion 22 of the housing 16. The tubular housing portion 22 partially defines a fluid chamber 24. A piston (not shown) is fixed to the rack 20 at a location within the chamber 24. The rack 20 is made from 1040 carbon steel, available from LTV Steel, and the tubular portion 22 of the housing 16 is made from 1018 carbon steel.

Upon rotation of the vehicle steering wheel (not shown), fluid under pressure is directed against the piston, causing the rack 20 to move axially within the housing 16, as is well known. Axial movement of the rack 20 moves the steering linkage connected to the ends of the rack 20 thus turning the steerable wheels of the vehicle.

An annular bushing 30 supports the rack 20 for axial movement within the tubular housing portion 22. The bushing 30 is preferably injection molded of a 45% glass filled polyester, such as Rynite ® 545 polyester, which is available from E. I. Dupont de Nemours & Co. The bushing 30 has a cylindrical inner surface 32 which defines a passage 34 (FIG. 3) through the bushing 30. The bushing 30 also has a cylindrical outer surface 36. The outer surface 36 includes a greater diameter portion 38 at one end, a reduced diameter portion 40 at the other end, and a tapered step 42 connecting them. A snap ring groove 44 is formed in the greater diameter portion 38.

At one axial end of the bushing 30, a flat annular end face 48 extends between the inner surface 32 and the greater diameter portion 38 of the outer surface 36. At the other end of the bushing 30, an annular end face 50 extends between the inner surface 32 and the reduced diameter portion 40 of the outer surface 36.

The annular end face 50 includes an axially outermost first surface 52 which extends in a direction radially outwardly from the inner surface 32 and toward the axial center of the bushing 30. The end face 50 also includes a second surface 54 which extends from the first surface 52 in a direction radially inwardly toward the cylindrical inner surface 32 and toward the axial center of the bushing 30. The end face 50 also includes a third surface 56 which extends radially outwardly from the second surface 54 to the reduced diameter portion 40 of the outer surface 36 of the bushing 30. The first surface 52 and the second surface 54 define between them an annular retaining ridge 58. The second surface 54 and the third surface 56 define between them an annular groove 60 adjacent the retaining ridge 58.

A series of ribs and voids (FIGS. 5 and 6) are formed in the outer surface 36 of the bushing 30. The ribs and voids help provide a more uniform wall thickness for the bushing 30 as is desirable when the bushing 30 is made by molding. Specifically, the greater diameter portion 38 includes four equally spaced ribs 62, 64, 66, and 68 between which are four voids 70, 72, 74, and 76. The void 70 extends between the ribs 62 and 64 and is defined by a bottom wall 80, axially spaced side walls 82 and 84 (FIG. 5), a radially extending side wall 86 of the rib 64 (FIG. 6), and a radially extending side wall 88 of the rib 62. The void 76 extends between the ribs 62 and 68 and is defined by a bottom wall 90, axially spaced side walls 92 and 94 (FIG. 6), a radially extending side wall 96 of the rib 62, and a radially extending side wall 98 of the rib 68. Similarly, the void 72 (FIG. 6) extends between the ribs 64 and 66, and the void 74 extends between the ribs 66 and 68. The cylindrical outer surface 36 of the bushing 30 includes the outer face 100 of the rib 62, the outer face 102 of the rib 64, the outer face 104 of the rib 66, and the outer face 106 of the rib 68, along with the outer surface of an annular connector portion 110 extending circumferentially between the ribs.

A similar series of ribs and voids are formed in the reduced diameter portion 40 of the bushing 30. A void 112 extends between a rib 114 and a rib 116. A void 118 extends between the rib 116 and a rib 119. Two other voids and a fourth rib are formed on the side of the bushing not shown in FIG. 5. The ribs and voids in the reduced diameter portion 40 are similar to the ribs and voids in the greater diameter portion 38, and therefore will not be described herein in greater detail.

An annular seal member 120 (FIG. 3) is connected with the bushing 30. The seal member 120 includes an inner seal portion 122 having a radially inner seal surface 124. The seal member 120 also includes an outer seal portion 126 having a radially outer seal surface 128. An annular fluid receiving groove 130 is located between the inner seal portion 122 and the outer seal portion 126. The seal member 120 is preferably made of Viton ® elastomer or hydrogenated Nitrile ® elastomer.

An annular surface 132 (FIG. 3) of the seal member 12 engages the first surface 52 of the bushing end face 50. An annular second surface 134 of the seal member 120 engages the second surface 54 of the bushing end face 50. An annular third surface 136 of the seal member 120 engages the third surface 56 of the bushing end face 50. The surfaces 132, 134 and 136 of the seal member 120 together form an end face 142 of the seal member 120. An annular lip portion 140 of the seal member 120 is received in the groove 60 in the bushing end face 50. When the seal member 120 is in a relaxed condition, the inner diameter of the lip portion 140 of the seal member 120 is less than both the outer diameter of the retaining ridge 58 and the diameter of the groove 60 in the bushing 30.

A circular garter spring 144 is located in the fluid receiving groove 130 in the seal member 120. The garter spring 144 engages a radially outward facing surface 146 of the inner seal portion 122 of the seal member 120. The garter spring 144 presses the inner seal portion 122 of the seal member 120 radially inwardly. The garter spring 144 is a commercially available steel item. The seal member 120 is purchased with the garter spring 144 in place.

A snap ring 150 is received in the groove 44 in the bushing 30. The snap ring 150 includes a pair of eyelets 152 and 154 (FIG. 4) and a spring portion 156 extending between the eyelets 152 and 154. In the relaxed condition of the snap ring 150 shown in FIG. 4, the bottom surface 158 of the snap ring 150 is spaced radially outwardly from the bottom surface 160 of the snap ring groove 44. The end face 48 of the bushing 30 and the greater diameter portion 38 of the bushing 30 are cut away to form a window having a bottom surface 162. The surface 162 is located axially outward of a recessed portion 164 of the snap ring groove 44, into which the eyelets 152 and 154 are lowered to insert and remove the bushing 30 from the steering gear housing 16, as will be described hereinbelow in detail. A ring centering rib 166 aids in centering the snap ring 150 circumferentially on the bushing 30. The snap ring 150 is a commercially available steel part available from Spiralock Company.

To connect the seal member 120 with the bushing 30, the seal member 120 is moved axially toward the end face 50 of the bushing 30. The lip portion 140 of the seal member 120 is stretched radially outwardly a small amount, passes over the retaining ridge 58 and drops into the groove 60 in the bushing 30. The lip portion 140 grips radially inwardly on the bushing end face 50 to provide an interference fit between the seal member 120 and the bushing 30. The retaining ridge 58 and the lip portion 140 are interdigitated, and the seal member 120 is thus interlocked with the bushing 30. In this assembled condition, the outer seal surface 128 extends radially outward of the cylindrical outer surface 36 of the bushing 30. The inner seal surface 124 of the seal member 120 extends radially inward of the inner cylindrical surface 32 of the bushing 30.

To assemble the snap ring 150 to the bushing 30, the eyelets 152 and 154 of the snap ring 150 are spread apart so that the snap ring 150 is larger in diameter than the bushing 30. The snap ring 150 is moved axially over the bushing 30 until the snap ring 150 is axially coincident with the snap ring groove 44. The snap ring eyelets 152 and 154 are then released and the parts of the snap ring 150 move radially inwardly into the groove 44 in the bushing 30.

The bushing and seal assembly 170 (FIGS. 1–4), which includes the bushing 30, the seal member 120, the garter spring 144, and the snap ring 150, is then inserted axially into the steering gear tubular housing portion 22 in the direction indicated by the arrow 172 (FIG. 2). A tapered end surface 173 of the tubular housing portion 22 compresses the snap ring 150 radially inwardly. Alternatively, an elongate hardened guide ring (not shown) can be inserted into the end of the tubular housing portion 22 to compress the snap ring 150 radially inwardly. The assembly 170 is moved axially inwardly until the snap ring 150 is axially coincident with a groove 174 in an inner cylindrical surface 176 of the tubular housing portion 22. The parts of the snap ring 150 spring radially outwardly into the groove 174 to lock the assembly 170 in place axially within the housing 16.

When the bushing 30 and the seal member 120 are assembled in the steering gear housing 16, the tubular housing portion 22 acts radially inwardly on the seal member 120. The tubular housing portion 22 presses the lip portion 140 of the seal member 120 into the groove 60 of the bushing 30, behind the retaining ridge 58. The tubular housing portion 22 thus urges the interlocking portions 140 and 58 into interlocking engagement, to retain the seal member 120 on the end face 50 of the bushing 30.

In this assembled condition, the rack 20 passes axially through the passage 34 in the bushing 30 and through the open center of the seal member 120. The outer seal surface 128 of the seal member 120 sealingly engage the inner surface 176 of the cylinder wall 22. The inner seal surface 124 of the seal member 120 sealingly engages the cylindrical outer surface 178 of the rack 20. The garter spring 142 assists in pressing the inner seal surface 124 against the outer surface 178 of the rack 20. Fluid under pressure in the chamber 24 urges the outer seal portion 126 radially outward and the inner seal portion 122 radially inward to assist in sealing. Because of the sealing engagement between the seal member 120 and the tubular housing portion 22 on the one hand, and between the seal member 120 and the rack 20 on the other hand, fluid cannot flow axially out of the chamber 24 past the seal member 120.

During operation of the vehicle steering gear 10, a surface 180 (FIG. 1) of the steering linkage 12 occasionally engages the end face 48 of the bushing 30. The steering linkage can engage the bushing 30 with up to about 6,000 pounds of force. This axially directed force is transmitted through the bushing 30 and the snap ring 150 into the tubular housing portion 22. The engagement between the snap ring 150 and the cylinder wall groove 174 provides a relatively large surface area to transmit this force to the tubular housing portion 22.

The assembly 170 may be removed by reaching into the open end of the tubular housing portion 22 with a suitable tool. The snap ring eyelets 152 and 154 are squeezed together and brought into the recessed portion 164 of the snap ring groove 44. The snap ring 150 is thus moved radially inwardly out of the groove 174, allowing removal of the assembly 170 from the housing 16.

The bushing 30 has a clearance fit with the inner cylindrical surface 176 of the tubular housing portion 22. The bushing 30 in the illustrated embodiment can move radially up to about 0.007 to 0.008 inches. Radial forces on the rack are transmitted through the solid inner cylindrical surface 32 of the bushing 30 and through the ribs 62, 64, 66, and 68, the connector portion 110, and the remainder of the greater diameter portion 38, to the tubular housing portion 22.

From the above description of the invention, those skilled in the art will perceive improvements, changes and modifications in the invention. Such improvements, changes and modifications within the skill of the art are intended to be covered by the appended claims.

I claim:

1. A method of assembling a power steering apparatus comprising the steps of:

providing a tubular housing partially defining a chamber for receiving fluid under pressure and having a first snap ring groove therein and a tapered end portion;

providing a rack extending axially through the chamber in the tubular housing;

providing an annular bushing for supporting the rack for axial movement in the chamber, the bushing having a cylindrical outer surface with a second snap ring groove therein, a cylindrical inner surface spaced radially inward from the outer surface and defining a passage extending longitudinally through the bushing for receiving the rack therethrough, and an annular radially extending end face between the inner and outer surfaces, the bushing end face having a retaining ridge and a groove;

providing an annular one-piece resilient seal member, the seal member having an annular outer seal surface for sealingly engaging the tubular housing and an annular inner seal surface for sealingly engaging the rack, the inner seal surface being spaced radially inward from the outer seal surface and defining a passage extending longitudinally through the seal for receiving the rack therethrough, the seal member having an annular radially extending end face between the inner and outer seal surface for engaging the end face of the bushing, the seal member having a resilient lip portion;

detachably connecting the seal member with the bushing by stretching the lip portion of the seal member radially outwardly, passing the lip portion of the seal member over the retaining ridge of the bushing and allowing the lip portion of the seal member to drop into the groove in the bushing;

placing the snap ring in the second snap ring groove in the bushing;

inserting the assembled bushing, seal member and snap ring axially into the tapered end portion of the tubular housing to compress the snap ring radially inwardly; and moving the assembled bushing, seal member and snap ring axially in the tubular housing until the snap ring snaps radially outwardly into engagement in the first snap ring groove in the tubular housing.

* * * * *